Sept. 17, 1968     K. G. CROWE     3,401,870
BLOWER ASSEMBLY
Filed Dec. 9, 1966
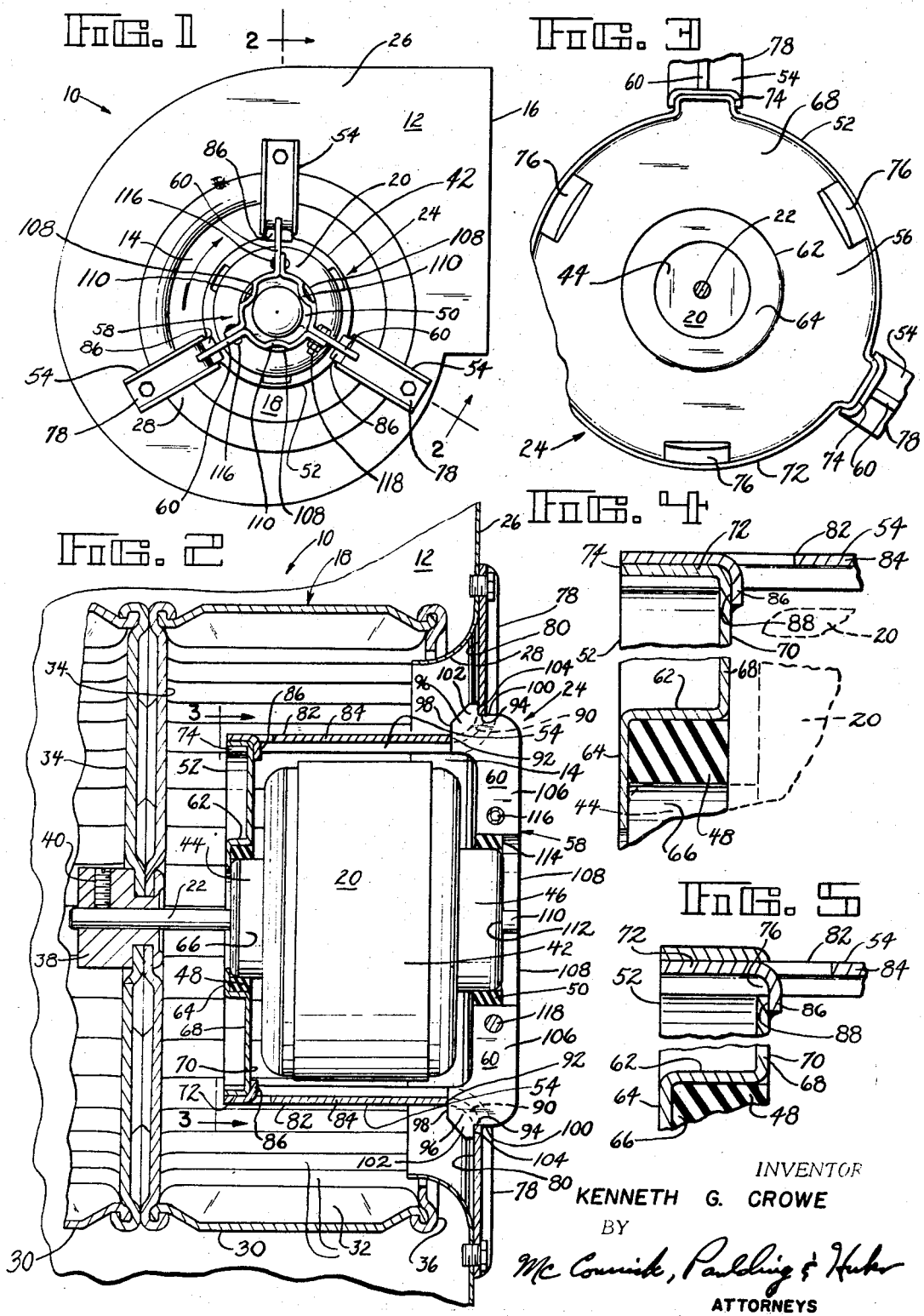
INVENTOR
KENNETH G. CROWE
BY
McCormick, Paulding & Huber
ATTORNEYS

3,401,870
BLOWER ASSEMBLY
Kenneth G. Crowe, Rhode-Ste.-Genese, Belgium, assignor to The Torrington Manufacturing Company, Torrington, Conn., a corporation of Connecticut
Filed Dec. 9, 1966, Ser. No. 600,573
13 Claims. (Cl. 230—117)

This invention relates to an improved blower assembly and deals more particularly with a blower assembly of the direct drive type in which an air impeller is supported in a blower housing by a drive motor.

The general object of this invention is to provide an improved blower assembly of the aforedescribed character for rapid assembly to affect accurate positioning of an air impeller unit and an associated drive motor in a blower housing.

A further object of this invention is to provide a compact blower assembly of the aforedescribed type.

Other objects and advantages of the invention will be apparent from the following description and from the drawing forming a part thereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a side elevational view of a blower assembly embodying the present invention.

FIG. 2 is a sectional view through the blower of FIG. 1 taken along the line 2—2 of FIG. 1.

FIG. 3 is a somewhat enlarged view of the motor support member as viewed along the line 3—3 of FIG. 2.

FIG. 4 is a somewhat enlarged fragmentary sectional view of the motor supporting bracket as it appears in FIG. 2, and shows a motor bracket arm in assembly with a motor support cradle.

FIG. 5 is a fragmentary view similar to FIG. 4, but shows the arm and the motor support cradle in a different relative position of assembly.

Referring now particularly to FIGS. 1 and 2 of the drawing, a centrifugal blower of the direct drive type embodying the present invention and indicated generally by the numeral 10 is shown to comprise a housing 12 having at least one air inlet 14 and an air outlet 16 and providing an enclosure for an air impeller or rotor indicated generally at 18. Power for driving the rotor is provided by a motor 20 including a rotatable shaft 22 to which the rotor is secured. A motor support bracket indicated generally at 24 fastened to a wall of the housing serves to support the motor 10 in a cantilever position relative to the wall and further serves to retain the rotor 18 in its proper position within the housing. To provide a compact blower assembly, the motor 20 is preferably supported generally within the housing 12 and at least partially surrounded by the rotor 18.

Various materials may be used to make the blower housing which may take various forms. In the illustrated embodiment 10 the housing 12 is made from sheet metal or like material and is characterized by thin walls, a generally volute or scroll shape, and a generally rectangular cross section. The housing includes substantially identical side walls 26, 26, one of which is shown. Each side wall 26 has an inwardly diverging bellmouthed portion 28 defining a circular air inlet 14 communicating with the interior of the housing.

The rotor 18 is preferably constructed from two parts or blower wheels 30, 30 of substantially equal diameter and of opposite hand fastened together in back-to-back relationship. Each wheel 30 includes a circumaxially spaced series of axially elongated air moving blades 32, 32 retained in assembly between a generally circular inner disk 34 and an outer ring 36 which defines an open end of the rotor. The two wheels 30, 30 are fastened together by a single hub 38 provided with a set screw 40 for securing the rotor to the motor shaft 22 for rotation in a clockwise direction as shown in FIG. 1.

The invention may be practiced with motors of various types and configurations, however, preferably and as shown the motor 20 includes a generally cylindrical casing 42 having co-axially extending front and rear end portions 44 and 46 of somewhat reduced diameter. The shaft 22 projects coaxially outwardly from the front end portion 44. Annular cushion members 48 and 50 made from rubber or like material respectively coaxially surround the motor end portions 44 and 46 and cooperate with the motor support bracket 24 to absorb motor and rotor vibration.

Important features of this invention reside in the motor support bracket 24 which generally comprises a motor support cradle 52 receiving and supporting the motor for forward end portion 44. The cradle is in turn supported by a body portion which may comprise a solid flanged cylindrical member but which preferably takes the form of a plurality of angularly spaced arms 54, 54 which project rearwardly from the cradle in radially outwardly spaced relation to the motor casing 42 and engage a wall of the housing 12. Support for the motor rear end portion 46 is provided by a spider indicated generally at 58 having a central portion engaging the motor casing 42 in axially spaced relation to the support cradle 52. The spider has a plurality of angularly spaced legs 60, 60, each of which projects generally radially outwardly from the central portion and cooperates with an associated arm 54 to secure the motor against movement relative to the blower housing.

Considering now the support bracket 24 in further detail, the cradle 52 is preferably formed from metal and includes an axially disposed annular wall portion 62 and a radially disposed wall portion 64 centrally apertured to permit the shaft 22 to extend forwardly therethrough. The wall portions 62 and 64 define a generally cylindrical rearwardly opening central recess 66 receiving and supporting the cushion member 48 and the associated motor end portion 44. An integral annular flange 68 having a rearwardly facing surface 70 surrounds the recess 66 and extends radially outwardly beyond the outer surface of the motor casing 42 terminating in a forwardly extending annular wall portion 72. A plurality of angularly spaced and axially extending ribs 74, 74 are formed on the wall portion 72 and project radially outwardly therefrom. At this point it should be noted that the cradle 52 also includes a plurality of angularly spaced openings or slots 76, 76 formed in the wall portion adjacent the peripheral wall 72 which may also be employed in positioning the arms 54, 54 relative to the cradle 52 as will be hereinafter further discussed.

In the illustrated embodiment the cradle 52 is supported by three generally L-shaped arms 54, 54 formed from channel stock and welded to the cradle. Each arm 54 has a radially outwardly extending portion 78 engaging a wall 26 exteriorly of the housing 12 and defining a forwardly facing surface 80. Each arm further includes an axially extending portion 82 which extends forwardly into the housing through an inlet opening 14 and engages the cradle therein. The generally U-shaped channel from which each arm is formed includes a central web 84 and opens radially inwardly receiving and generally conforming to the configuration of an associated cradle rib 74.

Thus, each channel cooperates with a respectively associated rib 74 to provide an orientation means for angularly positioning an arm 54 in assembly with the cradle 52. Proximate the forward end of each arm a tab 86 is bent inwardly from the web 84 and includes a forwardly facing surface 88 which engages the cradle surface 70 to provide a further orientation means for axially positioning the arm with respect to the cradle 52, as best shown in FIG. 4.

To facilitate connection between the spider 58 and the legs 54, 54, each leg is provided with an opening or slot 90 which lies within an axial plane at the junction between its axially extending portion 82 and its radially extending portion 78 and is partially defined by the latter portion. A rearwardly facing surface and a radially inwardly facing surface are respectively defined by slot end walls 92 and 94.

Considering now the spider 58 it will be noted that the spider has three axially disposed bladelike members or legs 60, 60 each of which cooperates with an associated arm 54. The legs are generally L-shaped and each includes a forwardly directed portion 96 having a width substantially equal to the width of an associated slot 90 in which it is received. A forwardly facing surface 98 and an outwardly facing surface 100 defined by the portion 96 respectively engage associated slot walls 92 and 94. At its forward end each leg 60 has an outwardly projecting tab 102 which includes a rearwardly facing surface 104 engaging an associated portion of an arm surface 80.

Each leg 60 further includes an inwardly directed portion 106 terminating in a parti-cylindrical segment 108 which engages an associated portion of the cushion member 50. The segments 108, 108 cooperate to define a central portion or band surrounding the cushion member, the end portion of each segment being secured to an adjacent leg 60 by a suitable fastener.

To facilitate rapid and accurate positioning of the spider 58 relative to the cushion member 50, each segment 108 includes a radially inwardly bowed portion 110 defining a forwardly facing surface 112 which engages the rearwardly facing surface 114 on the cushion member 50, as best shown in FIGS. 1 and 2.

In the presently preferred embodiment of the invention, to reduce assembly time rivets 116, 116 are used to secure two of the three segments 108, 108 in assembled relationship. A bolt 118 completes the assembly joining the segments in clamping engagement with the cushion member 50 and with the motor end portion 46. When the segments 108, 108 are fastened together in the aforedescribed manner, it is preferable to first assemble the spider 58 with the motor 20 and then assemble the motor with the motor support bracket 24 before securing the support bracket to the blower housing. Thus, the free ends of the arms 54, 54 may be sprung radially outwardly to permit the tabs 102, 102 to enter respectively associated slots 90, 90.

When removable fasteners are employed to join the segments 108, 108 the novel configuration of the legs 60, 60 permits the spider 58 to be readily assembled with the motor and the motor support bracket after the bracket has been secured to the blower housing. The latter construction also permits removal of the motor 20 for servicing or replacement while the bracket remains in assembly with the blower housing. This construction further assures proper alignment of the motor and the rotor within the housing when the unit is reassembled and is contemplated within the scope of this invention.

The invention may be practiced with a motor having a casing somewhat smaller than the casing of the motor 20. When a smaller motor is used it is desirable to assemble the motor bracket with the arms 54, 54 spaced radial inwardly from the positions shown in FIGS. 1–4 with respect to the cradle 52 to reduce the vibrational characteristics of the unit and to impart rigidity to the structure. It is for this purpose that the slots 76, 76 are provided.

Referring now to FIG. 5 an arm 54 is shown in assembly with the cradle 52. The forward end of the arm 54 is received in a slot 76 which provides an orientation means for angularly and radially positioning the arm relative to the cradle member. It will be noted that the tab 86 engages the cradle surface 70 to axially position the arm in the manner aforedescribed.

The invention claimed is:

1. A blower assembly comprising a blower housing having an air inlet and an air outlet, a motor having a casing and including a rotatable shaft axially forwardly projecting from said casing, an air impeller supported on said shaft for rotation within said housing, and a motor support bracket including a cradle receiving and supporting a forward end portion of said motor, and having a radially outwardly spaced body portion secured thereto and extending generally axially rearwardly therefrom, said body portion having a generally axially extending portion and a rearward generally radially extending portion secured to a wall of said housing and including a plurality of openings therethrough axially spaced from said cradle, said motor support bracket further including a spider adapted to be secured at a central portion to said casing in rearwardly and axially spaced relation with said cradle and having a plurality of angularly spaced legs generally radially outwardly projecting from said central portion, each of said legs engaging said body portion and including a locking tab, each said tab being received in an associated one of the said openings, said legs and said tabs being brought into locking engagement with said body portion to secure said motor against axial, radial and rotational movement relative to said blower housing when said central portion of said spider is secured to the casing as aforesaid.

2. A blower assembly as defined in claim 1 wherein said opening is a slot generally disposed within an axial plane at the junction between said axially extending portion and said radially extending portion and partially defined by said radially extending portion.

3. A blower assembly as set forth in claim 2 wherein each of the said legs is a generally L-shaped member having a generally axially forwardly directed portion and including a generally radially inwardly directed portion, said member having surface portions engaging associated walls defining said slot, said tab projecting from said forwardly directed portion and including a rearwardly facing surface engaging an associated surface of said radially extending portion.

4. A blower assembly as set forth in claim 1 wherein said body portion is formed by a plurality of angularly spaced arms, each of the said arms defining one of the said openings.

5. A blower assembly as defined in claim 4 including orientation means for locating each of the said arms relative to said cradle.

6. A blower assembly as defined in claim 5 wherein each of the said arms includes a radially inwardly opening channel portion and wherein said orientation means includes a plurality of angularly spaced radially outwardly projecting and generally axially extending ribs formed on said cradle, each of the said ribs being received in an associated channel portion.

7. A blower assembly as set forth in claim 5 wherein said cradle includes a generally radially disposed wall portion and wherein said orientation means includes a plurality of angularly and radially outwardly spaced openings through said wall portion, each said opening receiving an associated end portion of one of the said arms.

8. A blower assembly as set forth in claim 5 wherein said cradle includes a generally radially disposed axially rearwardly facing surface and wherein said orientation means includes an axially forwardly facing orientation surface on each of the said arms engaging an associated portion of said rearwardly facing surface.

9. A blower assembly as set forth in claim 8 wherein each said orientation surface is defined by a tab formed on an associated one of the said arms.

10. A blower assembly as defined in claim 1 wherein each of the said legs includes an inner end portion defining a segment engaging an associated portion of said motor casing, said segments cooperating to form a band generally surrounding a portion of said motor casing and wherein fastener means are provided for joining said segments in clamping engagement with said casing.

11. A blower assembly ts defined in claim 10 including an annular cushion member surrounding said motor casing portion and having a rearwardly facing surface, said segments engaging said cushion member and wherein each of the said segments includes a forwardly facing surface engaging an associated portion of said rearwardly facing cushion surface.

12. A blower assembly as defined in claim 1 wherein said motor cradle has an opening therethrough, said shaft extending through said opening, and wherein said motor and at least a portion of said motor bracket are received in said blower housing, said body portion extending outwardly through said inlet, said radially extending portion being outwardly directed and engaging the exterior surface of the housing wall defining said inlet.

13. A blower assembly as defined in claim 12 wherein said air impeller is a generally drum-shaped rotor having an open end through which said motor extends, said rotor at least partially surrounding said motor.

References Cited
UNITED STATES PATENTS

| | | | |
|---|---|---|---|
| 3,145,910 | 8/1964 | Jolly | 230—117 |
| 3,159,108 | 12/1964 | Mullings | 230—235 |

ROBERT M. WALKER, *Primary Examiner.*